(12) United States Patent
Cuddihy et al.

(10) Patent No.: US 8,427,324 B2
(45) Date of Patent: Apr. 23, 2013

(54) METHOD AND SYSTEM FOR DETECTING A FALLEN PERSON USING A RANGE IMAGING DEVICE

(75) Inventors: Paul Edward Cuddihy, Ballston Lake, NY (US); Corey Nicholas Bufi, Troy, NY (US)

(73) Assignee: General Electric Company, Niskayuna, NY (US)

( * ) Notice: Subject to any disclaimer, the term of this patent is extended or adjusted under 35 U.S.C. 154(b) by 389 days.

(21) Appl. No.: 12/847,321

(22) Filed: Jul. 30, 2010

(65) Prior Publication Data

US 2012/0025989 A1  Feb. 2, 2012

(51) Int. Cl.
G08B 23/00  (2006.01)

(52) U.S. Cl.
USPC ............. 340/573.1; 340/573.7; 382/106

(58) Field of Classification Search ............. 340/573.1
See application file for complete search history.

(56) References Cited

U.S. PATENT DOCUMENTS

| | | |
|---|---|---|
| 6,433,690 B2 | 8/2002 | Petelenz et al. |
| 6,462,663 B1 | 10/2002 | Wilson et al. |
| 7,106,885 B2 | 9/2006 | Osterweil et al. |
| 7,141,026 B2 | 11/2006 | Aminian et al. |
| 7,440,620 B1 | 10/2008 | Aartsen |
| 7,502,498 B2 | 3/2009 | Wen et al. |
| 7,532,111 B2 | 5/2009 | LaRue |
| 7,541,934 B2 | 6/2009 | Fredriksson et al. |
| 7,567,200 B1 | 7/2009 | Osterweil |
| 7,663,502 B2 | 2/2010 | Breed |
| 2006/0145874 A1* | 7/2006 | Fredriksson et al. ...... 340/573.1 |
| 2010/0053592 A1 | 3/2010 | Yahav et al. |

FOREIGN PATENT DOCUMENTS

| | | |
|---|---|---|
| FR | 2870378 A1 | 11/2005 |
| JP | 2000285223 A | 10/2000 |
| JP | 2003057007 A | 2/2003 |

OTHER PUBLICATIONS

Bart Jansen, Frederik Temmermans and Rudi Deklerck; "3D human pose recognition for home monitoring of elderly"; Proceedings of the 29th Annual International; Conference of the IEEE EMBS Cité Internationale, Lyon, France Aug. 23-26, 2007; 3Pages.

B. Jansen and R. Deklerck; "Home Monitoring of Elderly People With 3D Camera Technology"; IEEE Benelux EMBS Symposium, Belgian Day on Biomedical Engineering, Dec. 7-8, 2006, 4Pages.

Adam Williams et al; "Distributed Smart Cameras for Aging in Place"; University of Massachusetts, Department of Computer Science, Amherst, MA, 01003 6Pages, Jan 2006.

Search Report from corresponding GB Application No. GB1112558.0 dated Nov. 15, 2011.

* cited by examiner

Primary Examiner — Kerri McNally
(74) Attorney, Agent, or Firm — Marie-Claire B. Maple (57) ABSTRACT

A method and system for detecting a fallen person is described. An initial range image corresponding to a field of view of a DAS is generated. Further, a reference plane disposed in the field of view is identified. Additionally, one or more regions in the initial range image indicative of one or more objects disposed above the reference plane in the field of view are determined. Further, the DAS regenerates a range image corresponding to the field of view after a determined time period. The regenerated range image is compared with the initial range image to determine if the regenerated range image comprises a new object disposed above the reference plane. The new object is determined to be the fallen person if a height of the new object is less than a determined height and a volume and/or a surface area of the new object is greater than a determined value.

17 Claims, 5 Drawing Sheets

METHOD AND SYSTEM FOR DETECTING A FALLEN PERSON USING A RANGE IMAGING DEVICE

BACKGROUND

Embodiments of the present technique relate generally to health monitoring, and more particularly to methods and systems for fall detection.

Unintentional falls are one of the most complex and costly health issues facing elderly people. Recent studies show that approximately one in every three adults age 65 years or older falls each year, and about 30 percent of these falls result in serious injuries. Particularly, people who experience a fall event at home may remain on the ground for an extended period of time as help may not be immediately available. The studies indicate a high mortality rate amongst such people who remain on the ground for an hour or more after a fall.

Fall detection (FD), therefore, has become a major focus of healthcare facilities. Conventionally, healthcare facilities employ nursing staff to monitor a person around the clock. In settings such as assisted living or independent community life, however, the desire for privacy and the associated expense render such constant monitoring undesirable. Accordingly, FD systems based on wearable devices including sensors such as accelerometers, gyroscopes and/or microphones have been proposed. These devices, however, may need to be activated by a fallen person using a push-button to alert appropriate personnel or a health monitoring system. FD systems based on such wearable devices, therefore, may be successful only if the person wears the sensing devices at all times and is physically and cognitively able to activate the alarm when an emergency arises.

Therefore, in recent times, video-based FD systems are being widely investigated for efficient fall detection. Conventional video-based FD systems process images of the person's motion in real time to evaluate if detected horizontal and vertical velocities corresponding to the person's motion indicate a fall event. Determination of the horizontal and vertical velocities while detecting human falls involves use of complex computations and classification algorithms, thereby requiring a great deal of processing power and expensive equipment. Additionally, such video-based FD systems fail to robustly detect slow falls that may be characterized by low horizontal and vertical velocities. Further, use of such video-based FD systems typically involves acquisition of personally identifiable information leading to numerous privacy concerns. Specifically, constant monitoring and acquisition of identifiable videos is considered by many people to be an intrusion of their privacy.

It may therefore be desirable to develop an effective method and system for detecting high-risk movements, especially human fall events. Specifically, there is a need for a relatively inexpensive FD system capable of easily and accurately computing one or more parameters indicative of potential fall events such as a size and a distance corresponding to objects disposed in an FD environment. Additionally, there is a need for an FD method and a system that non-intrusively yet reliably detect a wide variety of falls with a fairly low instance of false alarms.

BRIEF DESCRIPTION

In accordance with aspects of the present technique, a method for detecting a fallen person is presented. The method includes generating an initial range image corresponding to a field of view of a data acquisition system. Particularly, a reference plane disposed in the field of view of the data acquisition system is identified. Additionally, one or more regions in the initial range image indicative of one or more objects disposed above the reference plane in the field of view of the data acquisition system are determined. Further, the data acquisition system regenerates a range image corresponding to the field of view of the data acquisition system after a determined time period. The regenerated range image is then compared with the initial range image to determine if the regenerated range image comprises a new object disposed above the reference plane. Subsequently, the new object disposed above the reference plane is determined to be the fallen person if a height of the new object is less than a determined height and at least one of a volume and a surface area of the new object is greater than a determined value.

In accordance with aspects of the present system, a system for detecting a fallen person is described. To that end, the fall detection system includes a data acquisition system that generates an initial range image corresponding to a field of view of the data acquisition system. The fall detection system further includes a processing subsystem communicatively coupled to the data acquisition system. The processing subsystem identifies a reference plane disposed in the field of view of the data acquisition system. Further, the processing subsystem determines one or more regions in the initial range image indicative of one or more objects disposed above the reference plane in the field of view of the data acquisition system. Additionally, the processing subsystem regenerates a range image corresponding to the field of view of the data acquisition system after a determined time period. The processing subsystem then compares the regenerated range image with the initial range image to determine if the regenerated range image comprises a new object disposed above the reference plane. Subsequently, the processing subsystem determines whether the new object disposed above the reference plane is the fallen person if a height of the new object is less than a determined height and at least one of a volume and a surface area of the new object is greater than a determined value.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

The following description presents systems and methods for monitoring a person. Particularly, certain embodiments illustrated herein describe systems and methods for detecting a fallen person using a 3-dimensional (3D) depth camera or a 3D range camera. In the following description, the terms '3D depth camera' and '3D range camera' are used interchangeably for referring to a device that captures a depth value or a range value of a pixel in a scene. Moreover, the terms 'depth value' or 'range value' refer to a relative distance of the pixel from a reference point such as the 3D range camera. Although the present system describes the use of a 3D range camera, the system may include any other suitable type of range imaging device, such as an active infrared and/or a time-of-flight (TOF) device, for use in different operating environments for detecting a fallen object. An exemplary environment that is suitable for practicing various implementations of the present system is described in the following sections with reference to FIG. 1.

Figure 1:
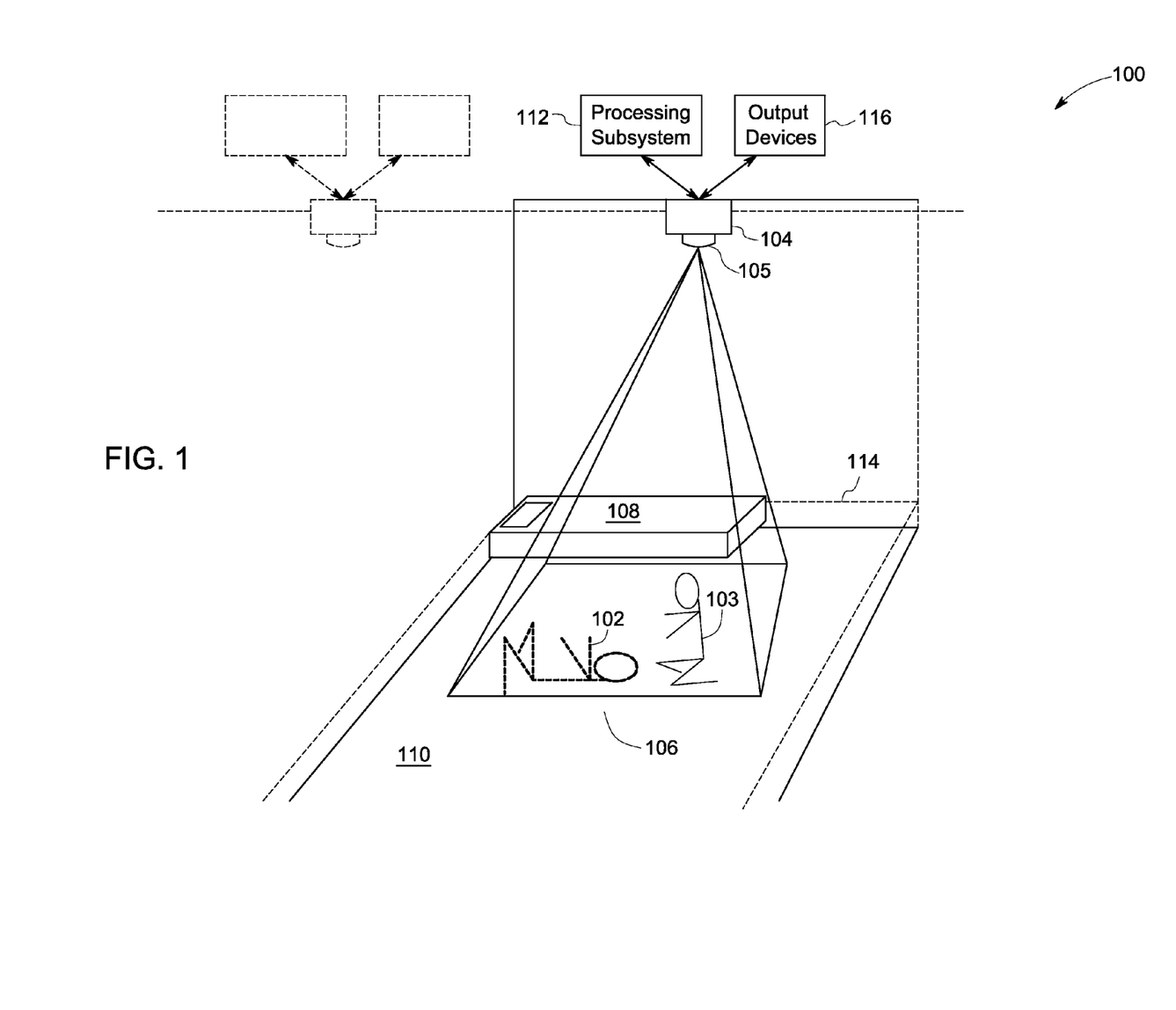
FIG. 1 is a block diagram of an exemplary system for detecting a fallen person, in accordance with aspects of the present system.

FIG. 1 illustrates an exemplary system 100 for monitoring an object such as a fallen person 102, a kneeling person 103, and so on. In one embodiment, the system 100 includes a data acquisition system (DAS) 104 for monitoring a field of view 106 and one or more objects that may be disposed in the field of view 106 of the DAS 104. By way of example, the field of view 106 may include a room including one or more objects such as the fallen person 102, the kneeling person 103, furniture 108 such as bed, chair, and table or other room structures such as columns and chandeliers (not shown). In accordance with aspects of the present technique, the DAS 104 generates an initial range image of the field of view 106 based on a distance of the one or more objects 102, 103, 108 disposed in the field of view 106 from a reference point. By way of example, the reference point may include the DAS 104, a reference plane or any other suitable reference element disposed in the field of view 106. Specifically, the DAS 104 generates the initial range image of the field of view 106 based on a relative distance of a plurality of pixels corresponding to the field of view 106 and/or the one or more objects 102, 103, 108 disposed in the field of view 106 from the reference point. To that end, the DAS 104 may include any suitable type of range imaging device operating on, for example, TOF, coded aperture, structured light, or triangulation principles. Further, in accordance with aspects of the present technique, the DAS 104 does not process identifiable video images, and therefore is less invasive on personal privacy.

In certain embodiments, the DAS 104 may include optics 105 such as a wide-angle lens for capturing large areas of the field of view 106 reliably and cost effectively. Alternatively, the DAS 104 may specifically monitor relevant regions of the field of view 106 where a risk associated with a potential fall event may be high. The DAS 104, therefore, is appropriately positioned at a desired position to effectively monitor the relevant regions of the field of view 106. Accordingly, in one embodiment, the DAS 104 is approximately positioned at the center of the ceiling of the room for monitoring the field of view 106 and the one or more objects 102, 103, 108 disposed in the field of view 106. Positioning the DAS 104 at the center of the ceiling may minimize the area that may be shielded from view by the furniture 108. In alternative embodiments, however, the DAS 104 may be positioned at other locations such as on one of the walls adjacent to a staircase or a stair well that allow for the field of view 106 of the DAS 104 to include regions where a risk associated with a potential fall event may be high.

Although the presently illustrated embodiment in FIG. 1 depicts a single DAS 104, multiple DASs may be disposed at different locations in the room for effectively monitoring a wide area such as a large room or a room with structures or objects that impair the field of view. Particularly, in certain embodiments, the multiple DASs may operate independently or be communicatively coupled through wired and/or wireless links to each other and/or a central health monitoring system for communicating alerts and other information regarding potential fall events detected in the field of view 106.

Further, in accordance with aspects of the present technique, the DAS 104 generates an initial range image corresponding to the field of view 106 and the one or more objects disposed in the field of view 106. Particularly, the DAS 104 generates the initial range image based on a range or a depth value corresponding to the plurality of pixels corresponding to the one or more objects disposed in the field of view 106. As previously noted, the range or depth value corresponds to a relative distance of the plurality of pixels corresponding to the one or more objects disposed in the field of view 106 from the reference point.

Accordingly, in one embodiment, the DAS 104 includes a 3D range camera based on the TOF principle. Further, the DAS 104 captures the range value or the depth value corresponding to an object such as the fallen person 102 disposed in the field of view 106. To that end, in certain embodiments, the DAS 104 emits pulses of infra-red (IR) light towards the one or more objects and detects the light reflected from a surface of the one or more objects. The energy corresponding to the light reflected from the one or more objects 102, 103, 108 disposed in the field of view 106 correlates inversely to the relative distances of the one or more objects disposed in the field of view 106.

In one embodiment, the DAS 104 uses the inverse correlation between the detected energy and relative distances of the one or more objects disposed in the field of view 106 to generate the initial range image as a depth map corresponding to the field of view 106. Alternatively, if the DAS 104 is positioned on a sidewall in the room, standard trigonometric functions may be used to appropriately modify the distance calculations for determining the relative distances of the one or more objects disposed in the field of view 106. Further, the DAS 104 may represent the range or depth value corresponding to each of the one or more objects disposed in the field of view 106 in the initial range image using, for example, a plurality of grey scale values. Particularly, each grey-scale value corresponds to a relative distance of the plurality of pixels corresponding to the one or more objects disposed in the field of view 106. Alternatively, the range or depth value may be represented using a colored scale with each color indicative of a determined distance of the plurality of pixels corresponding to the one or more objects disposed in the field of view 106. Additionally, the one or more objects disposed in the field of view 106 are arranged in layers in the initial range image according to the determined distance of the corresponding plurality of pixels from the reference point. The initial range image, thus, provides the depth information corresponding to the one or more objects disposed in the field of view 106 in near real time while using minimal processing power.

To that end, the system 100 identifies a reference plane 110 in the initial range image corresponding to the field of view 106 for determining the relative positioning of the one or more objects disposed in the field of view 106. By way of example, the reference plane 110 corresponds to the floor of a room, a bed disposed in the room, or any other suitable plane in the field of view 106. In one embodiment, a group of pixels oriented as a plane disposed furthest from the DAS 104 on an axis substantially perpendicular to the DAS 104 is identified as the reference plane 110. In an alternative embodiment, an exemplary heuristic selects the largest cluster disposed at the furthest distance from the DAS 104 as the reference plane 110.

Alternatively, a group of pixels oriented as a plane having the lowest Z coordinate position in the field of view 106 may be identified as the reference plane 110. In certain other embodiments, a plane at a determined distance from the DAS 104 may be designated to be the reference plane 110. To that end, the system may include, for example, a switching mechanism to select a mounting height of the DAS 104 to be set at a designated height such as 8, 10, or 12 feet from the reference plane such as a floor in a room. Additionally, in embodiments where the DAS 104 is mounted on a sidewall adjacent to a staircase or stair well, the reference plane 110 may be derived to generate a relative reference plane, an angled reference plane, or a plurality of reference planes such as in relation to a number of stairs.

Accordingly, in certain embodiments, the DAS 104 may include a processor and a memory (not shown) for identifying the reference plane 110 and performing related computations. Alternatively, the DAS 104 may be operatively coupled to a processing subsystem 112 through wired and/or wireless network connections (not shown) for determining the reference plane 110 and performing the related distance computations. By way of example, the DAS 104 may be coupled to the processing subsystem 112 through a wireless transceiver or a transmitter (not shown) for communicating all or portions of acquired image data to the processing subsystem 112. Further, the processing subsystem 112 may include one or more microprocessors, microcomputers, microcontrollers, and so forth, for processing the acquired image data. The processing subsystem 112, in some embodiments, may further include memory (not shown) such as RAM, ROM, disc drive or flash memory. Particularly, the processing subsystem 112 may use the memory for storing range values associated with the pixels corresponding to the field of view 106, positional coordinates of the reference plane 110 in the field of view 106, and so on.

Further, the processing subsystem 112 determines one or more regions in the initial range image to be representative of the one or more objects disposed in the field of view 106. Particularly, the processing subsystem 112 identifies one or more surfaces disposed above the reference plane 110 in the initial range image to be representative of the one or more objects disposed in the field of view. Alternatively, the one or more surfaces may be identified using the range image corresponding to the field of view 106.

The one or more surfaces, thus determined, are indicative of discontinuities in the reference plane 110, and therefore may be representative of the one or more objects such as the furniture 108 or room structures disposed in the field of view 106. The processing subsystem 112 further stores information relating to the reference plane 110 and the one or more objects disposed above the reference plane 110 in the initial range image as baseline information corresponding to the field of view 106. The baseline information determined from the initial range image may be indicative of a default configuration of the one or more objects disposed in the field of view 106, such as a room.

Additionally, in certain embodiments, the processing subsystem 112 masks the one or more objects identified from the initial range image as being representative of safe regions. Generally, the safe regions correspond to the regions of the field of view 106 where a risk associated with a potential fall event is low. The safe regions, thus, can be automatically determined based on the initial range image. Other embodiments, however, may allow processing subsystem 112 to determine the safe regions semi-automatically based on user input, or manually by a user. By way of example, the user can employ a graphical user interface (GUI) display of the room to select the safe regions by denoting them via the GUI.

Further, the processing subsystem 112 can direct the DAS 104 to regenerate a range image corresponding to the field of view 106 after a determined time period. In certain embodiments, the DAS 104 continually regenerates the range image corresponding to the field of view 106 after the determined time period while monitoring the field of view 106 for new objects. By way of example, the determined time period may correspond to about 1/10th of a second. Alternatively, the determined time period may be based on user preferences and/or application requirements to ensure early detection of new objects in the field of view 106.

Subsequently, the processing subsystem 112 compares the regenerated range image with the initial range image for determining if the regenerated range image includes a new object disposed in the field of view 106. Specifically, the processing subsystem 112 determines if the regenerated range image includes a new surface disposed above the reference plane 110 in addition to the masked objects identified in the initial range image. It may be noted that the new surface may correspond to a cluster of pixels disposed above the reference plane 110 in the field of view 106. Upon identifying the new surface, the processing subsystem 112 designates the new surface to be representative of the new object disposed above the reference plane 110. Further, the processing subsystem 112 determines a relative distance of the new object disposed above the reference plane 110. Additionally, the processing subsystem 112 determines a height, a surface area and/or a volume of the new object to determine if the new object corresponds to the fallen person 102 or a person disposed in a low-risk position such as the person 103 in a kneeling or a standing position.

In one embodiment, the height of the new object is determined based on a distance of the highest pixel corresponding to the new object from the reference plane 110. Moreover, the surface area and the volume of the new object may be determined by computing the surface area and the volume of each of the pixels corresponding to the new object. By way of example, the processing subsystem 112 may apply standard trigonometric functions to range values associated with each of the pixels corresponding to the new object for determining an approximate size of each corresponding pixel. As previously noted, the range values associated with each of the pixels correspond to a relative distance of each of the pixels from the reference point. Further, a sum of the approximate size of each of the pixels corresponding to the new object is indicative of the surface area of the new object.

Similarly, the processing subsystem 112 may determine a volume of each of the pixels corresponding to the new object based on a product of an approximate size and a determined height of each of the pixels above the reference plane 110. The processing subsystem 112 may then determine a volume of the new object based on a sum of the individual volumes of each of the pixels corresponding to the new object. In one embodiment, the processing subsystem 112 may use the volume of the new object to simply screen out unimportant objects and/or pets that may have moved into the field of view 106 without having to evaluate their shapes. In certain embodiments, however, the processing subsystem 112 may use a determined size and/or shape of an object to perform more complex masking of unimportant objects and/or pets while generating the initial range image, thereby minimizing false alarms.

Further, in accordance with aspects of the present technique, the processing subsystem 112 determines if the height corresponding to the new object is less that a determined height 114 and the surface area and/or the volume corresponding to the new object is greater than a determined value of surface area and/or volume. In one embodiment, the determined height 114 corresponds to a height such that a substantial portion of high-risk movements such as the person 102 crawling into the room or twitching on the floor may be confined below the determined height 114. In another embodiment, the determined height 114 corresponds to a waist height of the person 102, such as about 21 inches above the reference plane 110.

Generally, the processing subsystem 112 designates a height as the determined height 114 so as to minimize false alarms. Specifically, the processing subsystem 112 designates the height to ensure that at least a portion of the low-risk movements corresponding to a person lying on the bed (not shown), or the person 103 in the kneeling position, or sitting in a chair (not shown) is detected above the determined height 114. Similarly, the processing subsystem 112 designates a surface area, for example about 3 ft$^2$, corresponding to a surface area of an average person disposed in a low-risk position such as while standing or sitting in the field of view 106 as the determined surface area. Typically, a surface area greater than the determined surface area is indicative of the person 102 who may have fallen and is disposed on the floor.

Additionally, the processing subsystem 112 may designate a volume, for example about 18,000 cm$^3$, corresponding to the kneeling person 103 disposed in low-risk positions as the determined volume. Particularly, a volume greater than the determined volume may be indicative of the person 102 who may have fallen and is disposed on the floor. In certain cases, however, such as when the kneeling person 103 stands with outstretched arms and a volume computation includes volume of the pixels corresponding to the top of the arm to the reference plane 110, the volume of the person 103 may be greater than the determined volume. In order to prevent false alarms in such cases, the processing subsystem 112 further verifies if the height of the new object is less than the determined height 114. The processing subsystem 112, however, may still use the volume computation to distinguish a person from a cat, a dog or other small objects.

Thus, the processing subsystem 112 designates the new object to be the fallen person 102 if the height of the new object is less than the determined height 114 and the surface area and/or the volume of the new object is greater than the determined surface area and/or the determined volume, respectively. In one embodiment, the processing subsystem 112 designates the new object to be the fallen person 102 if the values corresponding to the height, the surface area and/or the volume of the new object do not substantially change over a determined period of time. Further, the processing subsystem 112 may determine a crawling movement of the person 102 based on movement of corresponding pixels indicated by the regenerated range image. Accordingly, one or more settings of the processing subsystem 112 may be customized to designate the person 102 determined to be crawling for more than the determined period of time to be a fallen object.

In embodiments relating to human fall detection, the determined period of time corresponds to a recovery time during which the person 102 may get up subsequent to a fall, and therefore, the height of the person 102 exceeds the determined height. By way of example, the determined period of time may be about 90 seconds. The processing subsystem 112, however, may vary the determined period of time based on other parameters such as a location of the fall and/or the presence of another person in the field of view 106.

Further, if the height of the new object is less than the determined height 114 and a surface area and/or the volume of the new object is greater than the determined surface area and/or the determined volume, the processing subsystem 112 generates an output. Specifically, the processing subsystem 112 generates the output through an output device 116 coupled to the DAS 104 and/or the processing subsystem 112. Moreover, the generated output includes an audio output and/or a visual output such as flashing lights, display messages and/or an alarm. To that end, the output device 116 includes an alarm unit, an audio transmitter, a video transmitter, a display unit, or combinations thereof, to generate the audio output and/or the video output. Additionally, the output device 116 generates and/or communicates an alert output signal through a wired and/or wireless link to appropriate personnel and/or another monitoring system to generate a warning or perform any other specified action. By way of example, the specified action may include sounding an alarm, sending an alert message to a mobile device such as a voice message, text message or email, flashing lights coupled to the system 100, and so on.

Thus, unlike conventional monitoring applications where determining fall events require complicated computations and expensive equipment, the processing subsystem 112 employs simple yet robust computations for detecting fall events. Specifically, the processing subsystem 112 detects a variety of fall events such as a slip fall, a slow fall and/or various other motion events simply by determining the height, the surface area and/or the volume of the new object disposed above the reference plane 110 in the field of view 106 over the determined time period. The determination of the height, the surface area and/or the volume of the new object is greatly facilitated by the use of a 3D range camera as the DAS 104 in the present embodiment.

Moreover, the 3D range camera uses a depth map of the field of view 106 as opposed to using an entire image to detect the fallen person 102 used in conventional video-based FD applications. As previously noted, the depth map includes a plurality of range values representative of a relative distance of each pixel corresponding to the person 102 rather than a personally identifiable image and/or video of the person 102. Employing the depth map, thus, eliminates the need to store images and/or other personally identifiable information, thereby mitigating privacy concerns.

Further, the 3D range camera generates a range image of the entire field of view 106 simultaneously as opposed to reading one pixel or line at a time as in conventional FD applications. The use of the 3D range camera as the DAS 104, thus, enables faster computations while using minimal processing. The structure and functioning of a system for monitoring an object using a 3D range camera, in accordance with aspects of the present technique, will be described in greater detail with reference to FIGS. 2-3.

Figure 2:
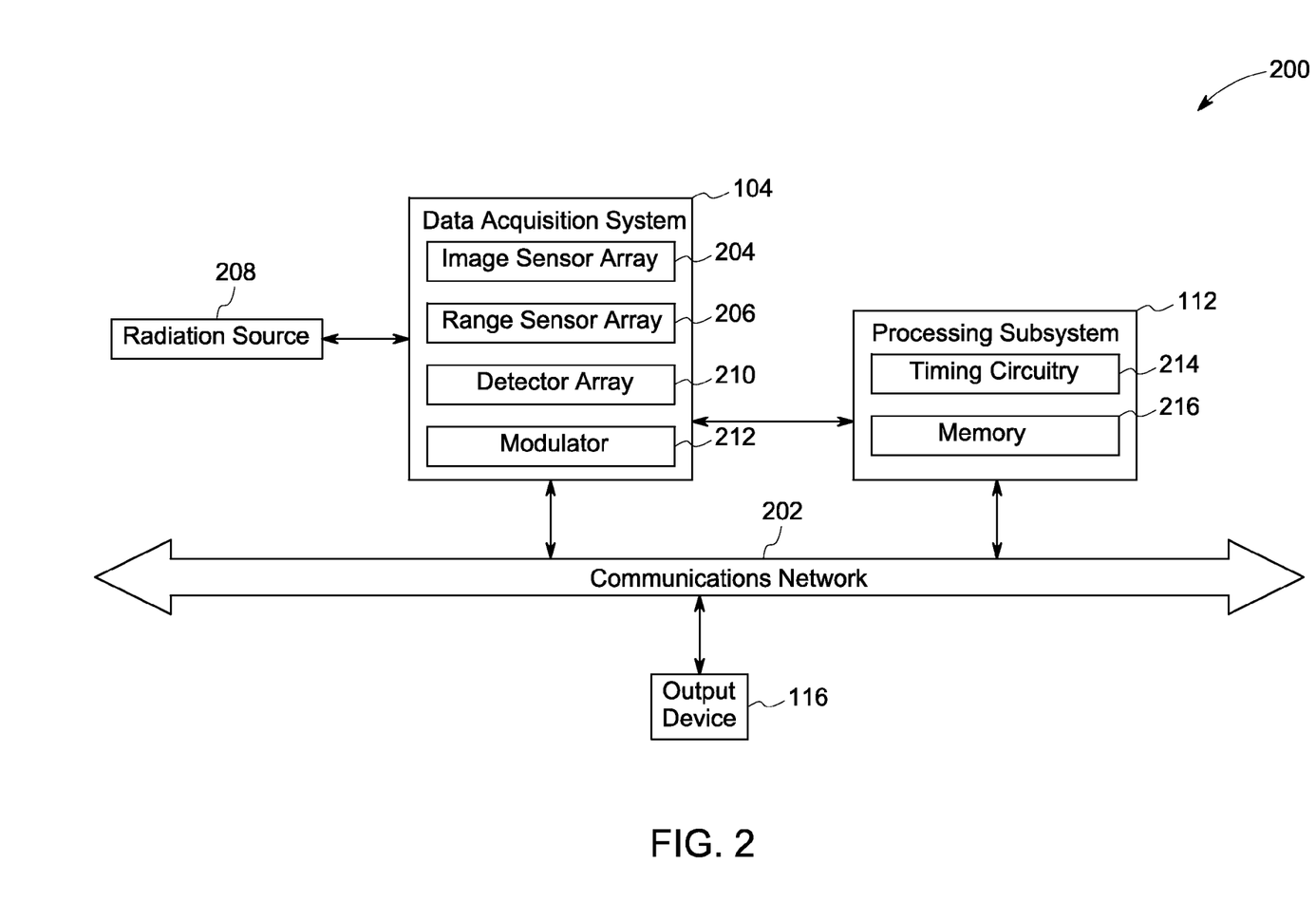
FIG. 2 is a block diagram of the system for detecting the fallen person illustrated in FIG. 1, in accordance with aspects of the present system.

FIG. 2 illustrates an exemplary block diagram of a system 200 for monitoring an object such as the person 102 of FIG. 1. For clarity, the system 200 is described with reference to the elements of FIG. 1. In one embodiment, the system 200 includes the DAS 104 operatively coupled to the processing subsystem 112 of FIG. 1 through a communication network 202. By way of example, the communication network 202 includes wired networks such as LAN and cable, and/or wireless networks such as WLAN, cellular networks, satellite networks, and short-range networks such as ZigBee wireless sensor networks. Further, the communication network 202 facilitates transmission of data captured by the DAS 104 to the processing subsystem 112 while monitoring a field of view, such as the field of view 106 of FIG. 1.

To that end, the DAS 104 is positioned at a desired position, such as approximately at the center of the ceiling in the field of view 106 to effectively monitor large areas of the field of view 106. Alternatively, the DAS 104 may be positioned at other locations such as on a wall adjacent to a staircase to monitor specific areas of the field of view 106 where a risk associated with a fall event is high. Once appropriately positioned, the DAS 104 generates an initial range image of the field of view 106. Particularly, the DAS 104 generates the initial range image based on range values associated with the pixels corresponding to the field of view 106. As previously noted, each of the range values corresponds to a relative distance of the pixel or each group of pixels corresponding to the field of view 106 and/or the one or more objects disposed in the field of view 106. Particularly, the range values corresponds to relative distances of the one or more objects from a reference plane such as the reference plane 110 of FIG. 1, the DAS 104 or another reference point disposed in the field of view 106.

Accordingly, in one embodiment, the DAS 104 includes an image sensor array 204 for capturing the pixels corresponding to the field of view 106 and a range sensor array 206 for determining a range value associated with each of the pixels. Further, in certain embodiments, the DAS 104 may also include a radiation source 208 and a detector array 210. The radiation source 208 illuminates the field of view 106, whereas the detector array 210 detects an intensity of radiation reflected from one or more objects disposed in the field of view 106. By way of example, the radiation source 208 may include a laser or other suitable type of light source, whereas the detector array 210 may include a Charge-Couple Device (CCD) or Complementary Metal-Oxide-Semiconductor (CMOS). Additionally, the DAS 104 may include a modulator 212 for modulating the radiation source 208 such that the radiation source 208 emits one or more short pulses of radiation towards the field of view 106 at desired time intervals, for example, every ten seconds.

In one embodiment, the range sensor array 206 determines a distance of pixels corresponding to one or more objects disposed in the field of view 106 from the DAS 104. Specifically, the range sensor array 206 determines the distance based on a time taken by the short pulses to travel from the radiation source 208 to the one or more objects and back to the detector array 210. To that end, the processing subsystem 112 includes timing circuitry 214 operatively coupled to the range sensor array 206 for determining the travelling time of the short pulses. Moreover, the energy detected by the detector array 210 for the pixels corresponding to the field of view 106 and the one or more objects disposed in the field of view 106 varies inversely with a distance of the pixels from the DAS 104. The range sensor array 206, therefore, determines the distance of the one or more objects from the DAS 104 based on detected energy of the corresponding pixels, the determined travelling time of the pulses and the knowledge of the speed of light. In alternative embodiments, where the DAS 104 is positioned on a wall of the room, standard trigonometric functions may be used to appropriately modify the distance computations. Particularly, the distance computations may be modified for reconciling an angular positioning of the DAS 104 and/or calculating relative distances from another reference point such as the reference plane 110.

Subsequently, the DAS 104 correlates image data captured by the image sensor array 204 with range data determined by the range sensor array 206 for the pixels corresponding to the field of view 106. To that end, in certain embodiments, the processing subsystem 112 includes a memory 216 for storing the image data, the range data, and correlations there between, for the pixels corresponding to the field of view 106. Specifically, in one embodiment, the DAS 104 uses the stored correlations to generate an initial 3D range image of the field of view 106 and the one or more objects disposed in the field of view 106. As previously noted, the initial range image provides a baseline configuration of the field of view 106 and the one or more objects disposed in the field of view 106. Further, the DAS 104 communicates the initial range image to the processing subsystem 112.

In accordance with aspects of the present technique, the processing subsystem 112 identifies a group of pixels oriented as a plane having the lowest Z coordinate position in the initial range image as the reference plane 110. As previously noted, the reference plane 110 may include a floor of a room, a bed or chair disposed in the room, or any other suitable plane in the field of view 106. The processing subsystem 112 further determines one or more regions in the initial range image indicative of one or more surfaces disposed above the reference plane 110. Particularly, the processing subsystem 112 determines the one or more regions to be representative of one or more objects disposed above the reference plane 110 in the field of view 106. Moreover, in certain embodiments, the processing subsystem 112 masks the one or more objects identified from the initial range image as being representative of safe regions where a risk associated with a potential fall event is low.

Further, the processing subsystem 112 directs the DAS 104 to continually regenerate a range image corresponding to the field of view 106 after each determined time period. Subsequently, the processing subsystem 112 compares the regenerated range image with the initial range image for determining if the regenerated range image includes a new object disposed in the field of view 106. Specifically, the processing subsystem 112 determines if the regenerated range image includes a new surface disposed above the reference plane 110 in addition to the masked objects identified in the initial range image. Upon identifying the new surface, the processing subsystem 112 designates the new surface to be representative of the new object disposed above the reference plane 110.

Subsequently, the processing subsystem 112 determines a height and a surface area and/or a volume of the new object. As previously noted, the height of the new object may be determined based on a distance of the highest pixel of the new object from the reference plane 110. Further, the surface area of the new object may be determined by summing an approximate size of each of the pixels corresponding to the new object determined by applying standard trigonometric functions to range values associated with the corresponding pixels. Moreover, the maximum volume of the new object may be determined by summing the volume of space above the reference plane 110 represented by each individual pixel corresponding to the new object.

Further, in accordance with aspects of the present technique, the processing subsystem 112 determines if the height of the new object is less that the determined height 114 and the surface area and/or the volume of the new object is greater than a determined surface area and/or a determined volume, respectively. In one embodiment, the determined height 114 corresponds to a waist height of the person 102, such as about 21 inches above the reference plane 110. Moreover, the determined surface area corresponds to a surface area, such as about 3 $ft^2$, of an average person disposed in a low-risk position such as while standing or sitting in the field of view 106. Similarly, the determined volume may correspond to a volume, such as 18,000 cm³, of a person disposed in a low-risk position. Therefore, the processing subsystem 112 designates the new object to be the fallen person 102 if the height of the new object is less than the determined height 114 and a surface area and/or the volume of the new object is greater than the determined surface area and/or the determined volume, respectively.

Specifically, the processing subsystem 112 designates the new object to be the fallen person 102 if the values corresponding to the height and the surface area and/or the volume of the new object do not substantially change over a determined period of time, such as about 90 seconds. As previously noted, the determined period of time corresponds to a recovery time during which the fallen person 102 may get up subsequent to a fall. Such a comparison of the height, the surface area and/or the volume of the new object with the determined height, the determined surface area and/or the determined volume prevents small objects such as pets and moving furniture from triggering an alert, thereby avoiding numerous false alarms. Certain embodiments, however, may allow the system 200 to be reset to a default position in case of a false alarm.

Further, the processing subsystem 112 generates an output if the height of the new object is less than the determined height 114 and a surface area and/or the volume of the new object is greater than the determined surface area and/or the determined volume, respectively. As previously noted, an object disposed at a height less than the determined height 114 in the field of view 106 and having a surface area and/or a volume greater than the determined surface area and/or the determined volume is indicative of the person 102 having experienced a potential fall event. Therefore, upon determining that the person 102 may have experienced a potential fall event, the processing subsystem 112 communicates the generated output to appropriate personnel or a healthcare monitoring system. Thus, in some embodiments, the system 200 may be implemented as a standalone system for monitoring an object in a field of view. In alternative embodiments, however, the system 200 may be implemented as part of a larger healthcare system for detecting the person 102 who may have experienced a fall event.

Figure 3:
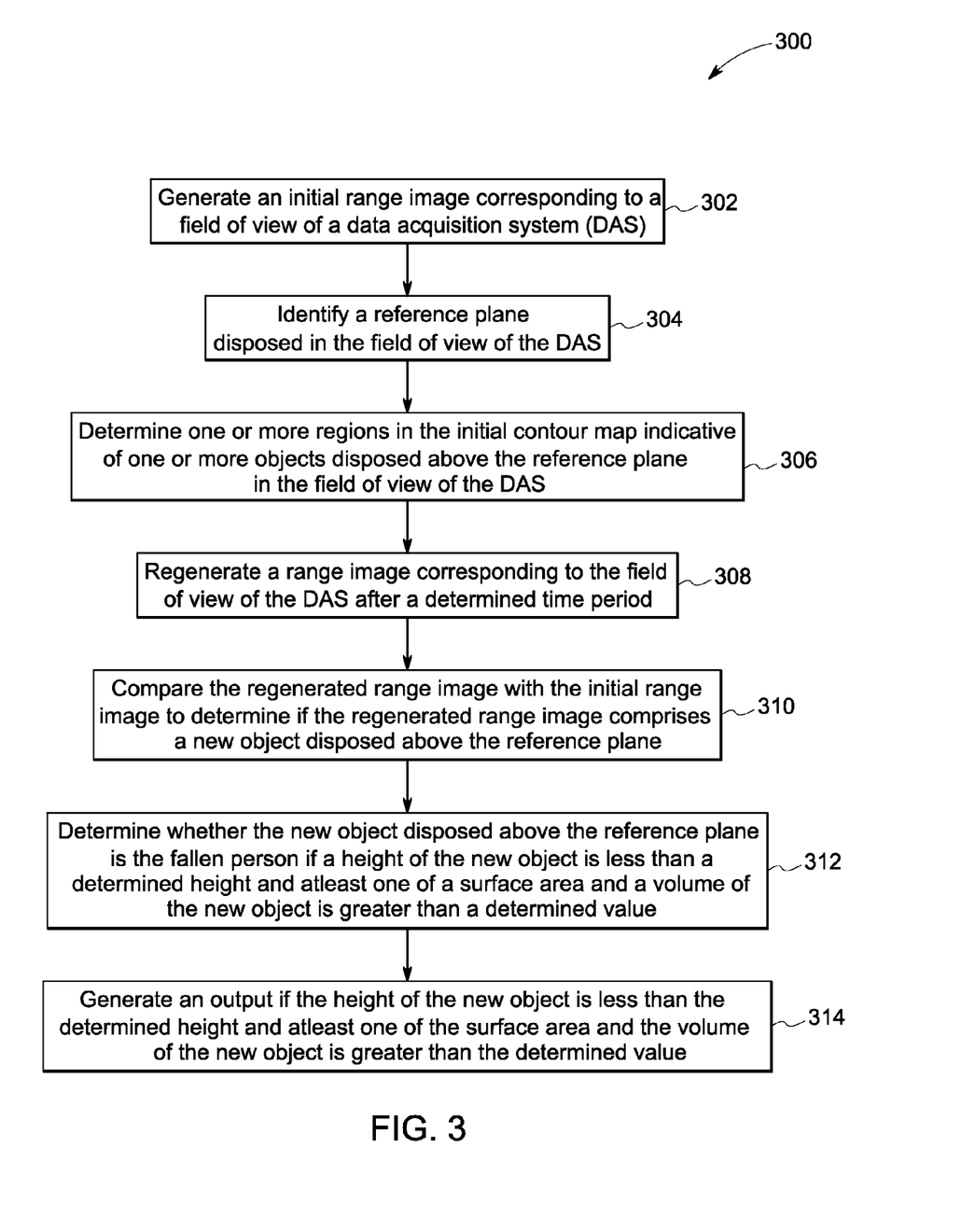
FIG. 3 is a flow chart illustrating an exemplary method for detecting a fallen person, in accordance with aspects of the present technique.

Turning to FIG. 3, a flow chart 300 depicting an exemplary method for monitoring an object in a field of view is presented. The exemplary method may be described in a general context of computer executable instructions on a computing system or a processor. Generally, computer executable instructions may include routines, programs, objects, components, data structures, procedures, modules, functions, and the like that perform particular functions or implement particular abstract data types. The exemplary method may also be practiced in a distributed computing environment where optimization functions are performed by remote processing devices that are linked through a communication network. In the distributed computing environment, the computer executable instructions may be located in both local and remote computer storage media, including memory storage devices.

Further, in FIG. 3, the exemplary method is illustrated as a collection of blocks in a logical flow chart, which represents a sequence of operations that may be implemented in hardware, software, or combinations thereof. The various operations are depicted in the blocks to illustrate the functions that are performed generally during generation of a range image, detection of a fallen object, and other phases of the exemplary method. In the context of software, the blocks represent computer instructions that, when executed by one or more processing subsystems, perform the recited FD operations. The order in which the exemplary method is described is not intended to be construed as a limitation, and any number of the described blocks may be combined in any order to implement the exemplary method disclosed herein, or an equivalent alternative method. Additionally, individual blocks may be deleted from the exemplary method without departing from the spirit and scope of the subject matter described herein. For discussion purposes, the exemplary method is described with reference to the implementations of FIGS. 1-2.

The exemplary method aims to simplify processes and computations involved in monitoring and detection of a fall event corresponding to an object such as the person 102 of FIG. 1 by using a 3D range camera as the DAS. An advantage of employing the 3D range camera is the use of non-identifiable images for monitoring and detection of the fall event instead of the personally identifiable video images used by conventional monitoring systems that are grossly intrusive on personal space. Accordingly, the DAS, such as the DAS 104 of FIG. 1 is appropriately positioned to acquire data corresponding to relevant regions of the field of view such as the field of view 106 of FIG. 1. In one embodiment, the DAS is positioned approximately at the center of the ceiling of a room to acquire image and range data associated with the pixels corresponding to the field of view such as the field of view 106 of FIG. 1. In alternative embodiments, however, the DAS may be positioned at other locations such as on one of the walls adjacent to a staircase or a stair well that allow for the field of view of the DAS to include regions where a risk associated with a potential fall event may be high.

Particularly, at step 302, the processing subsystem generates an initial range image corresponding to the field of view of the DAS. The initial range image is based on a relative distance of the pixels corresponding to one or more objects disposed in the field of view from a reference point such as the DAS. Accordingly, in one embodiment, the DAS emits pulses of infra-red (IR) light towards the field of view and detects the light reflected from a surface of the one or more objects disposed in the field of view. Further, the processing subsystem determines a distance based on a time taken by the emitted pulses to travel from the DAS to the one or more objects disposed in the field of view and back to the DAS. Moreover, the energy corresponding to the light reflected from the pixels corresponding to the one or more objects correlates inversely to the distance of the one or more objects from the DAS. The processing subsystem, therefore, determines the distance of the one or more objects from the DAS based on the detected energy of the pixel, the determined time taken by the pulses and the knowledge of the speed of light. In alternative embodiments, where the DAS is positioned on a wall of the room, standard trigonometric functions may be used to appropriately modify the distance computations. Particularly, the distance computations may be modified for reconciling an angular positioning of the DAS and/or calculating relative distances from another reference point.

Further, the processing subsystem arranges the one or more objects in a plurality of layers in the initial range image according to the corresponding distance information determined by the processing subsystem. The layered arrangement allows quick determination of a current position of the one or more objects in the field of view in relation to the other objects in the field of view in near real time while using minimal processing power. Moreover, the initial range image provides a baseline configuration of the field of view and the one or more objects disposed in the field of view that may be representative of a default or low-risk configuration. As previously noted, the one or more objects identified from the initial range image may be masked as being representative of safe regions having low fall risk.

Subsequently, at step 304, a reference plane such as the reference plane 110 of FIG. 1 is identified in the initial range image. As previously noted, the reference plane may correspond to a floor of a room, a bed or a chair disposed in the room or any other suitable plane in the field of view. The reference plane is identified using a processing subsystem such as the processing subsystem 112 of FIG. 1 that is operatively coupled to the DAS through a wired and/or wireless communication link such as the communication network 202 of FIG. 2.

In one embodiment, the processing subsystem designates a group of pixels oriented as a plane disposed furthest from the DAS on an axis substantially perpendicular to the DAS as the reference plane. In another embodiment, the processing subsystem employs an exemplary heuristic to select the largest cluster disposed at the furthest distance from the DAS as the reference plane. Alternatively, a group of pixels oriented as a plane having the lowest Z coordinate position may be identified as the reference plane. In certain other embodiments, a plane at a determined distance from the DAS may be designated to be the reference plane. Accordingly, the system may include, for example, a switching mechanism to select a mounting height of the DAS to be set at a designated height such as 8, 10, or 12 feet from the reference plane such as a floor in a room. Additionally, in embodiments where the DAS is mounted on a sidewall adjacent to a staircase or a stairwell, the reference plane may be derived to generate a relative reference plane, an angled reference plane, or a plurality of reference planes such as in relation to a number of stairs.

Further, at step 306, the processing system determines one or more regions in the initial range image indicative of one or more objects disposed above the reference plane. In certain embodiments, the processing subsystem further masks the one or more objects identified from the initial range image as being representative of safe regions where a risk associated with a potential fall event is low.

Figure 4:
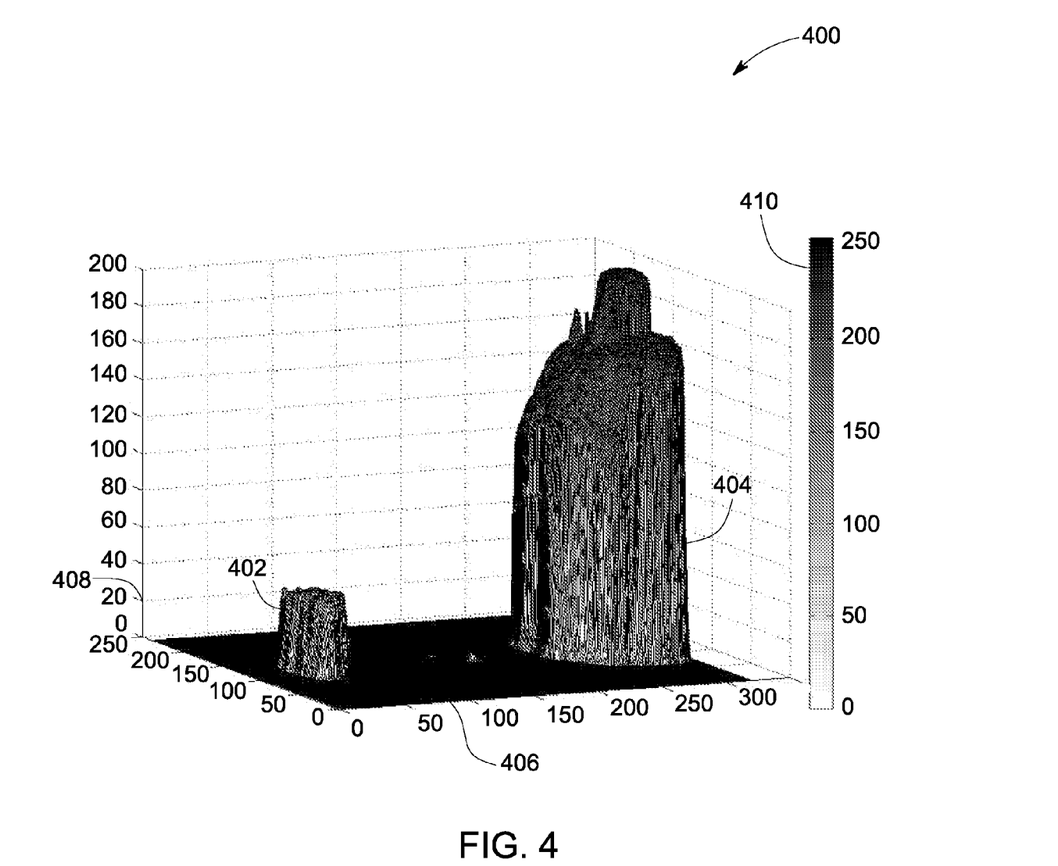
FIG. 4 is an illustration of an exemplary range image generated by an FD system, in accordance with aspects of the present technique.

FIG. 4 illustrates an exemplary representation 400 of an initial range image corresponding to the field of view of a DAS. Particularly, in FIG. 4, elements 402 and 404 represent objects disposed above a reference plane 406. By way of example, the element 402 may correspond to a small table whereas the element 404 may correspond to a person standing upright in the field of view. Further, an element 408 in the initial range image indicates a determined height. By way of example, the determined height 408 corresponds to about 21 inches. The initial range image 400 further includes an element 410 representative of a plurality of grey scale values indicative of relative distances of pixels corresponding to the field of view from the DAS.

As the corresponding height of the elements 402 and 404 is less than the determined height 408 and the corresponding surface area and/or volume of elements 402 and 404 is less than a determined surface area and/or a determined volume, elements 402 and 404 represent objects disposed in low-risk positions in the field of view. The configuration of the field of view depicted in FIG. 4, therefore, triggers no alerts to appropriate personnel or an associated health monitoring system. Further, the initial range image depicted in FIG. 4 provides a baseline configuration of the field of view and the one or more objects represented by the elements 402 and 404 disposed in the field of view representative of a default or low-risk configuration.

Referring again to FIG. 3, at step 308, the processing subsystem directs the DAS to continually regenerate a range image corresponding to the field of view after a determined time period, for example, after every 3 seconds. Subsequently, the processing subsystem, at step 310, compares the regenerated range image with the initial range image for determining if the regenerated range image includes a new object disposed above the reference plane 406 in the field of view. Specifically, the processing subsystem determines if the regenerated range image includes a new surface disposed above the reference plane 406 in addition to the initially identified objects present in the initial range image corresponding to the field of view. Upon identifying the new surface, the processing subsystem designates the new surface to be representative of the new object disposed above the reference plane 406.

Further, the processing subsystem determines a height and a surface area and/or a volume of the new object. As previously noted, the processing subsystem determines the height of the new object based on a distance of the highest pixel corresponding to the new object from the reference plane. Additionally, the processing subsystem may determine the surface area of the new object by summing an approximate size of each of the pixels determined by using standard trigonometric functions. Moreover, the processing subsystem may determine the volume of the new object by summing the volume of space above the reference plane represented by each individual pixel corresponding to the new object.

In accordance with aspects of the present technique, at step 312, the processing subsystem determines if the height of the new object is less that a determined height and the surface area and/or the volume of the new object is greater than a determined value. In one embodiment, the determined height corresponds to a height such that a substantial portion of high-risk movements such as the person crawling into the room or twitching on the floor may be confined below the determined height. In another embodiment, the determined height corresponds to a waist height of the person, such as about 21 inches above the reference plane.

Generally, the processing subsystem designates a height as the determined height to minimize false alarms by ensuring that at least a portion of the low-risk movements corresponding to the person lying on a bed or sitting in a chair disposed in the field of view is detected above the determined height. Alternatively, the determined height may be based on application requirements, such as size of the object to be monitored, a relative distance of the new object in the field of view and/or a resolution and range corresponding to the DAS.

In one embodiment, the processing subsystem designates a surface area, for example about 3 ft$^2$, corresponding to a surface area of an average person disposed in a low-risk position such as while standing or sitting in the field of view as the determined surface area. Typically, a surface area greater than the determined surface area is indicative of the person who may have fallen and is disposed on the floor.

Similarly, the processing subsystem designates a volume, for example about 18,000 cm$^3$, corresponding to a volume of an average person while standing or sitting in the field of view as the determined volume. Typically, a volume greater than the determined volume is indicative of the person who may have fallen and is disposed on the floor. In certain cases, however, such as when a person stands with outstretched arms and a volume computation includes volume of the pixels corresponding to the top of the arm to the reference plane, the volume of the person may be greater than the determined volume.

Therefore, the processing subsystem designates the new object to be the fallen person only if the height of the new object is less than the determined height and the surface area and/or the volume of the new object is greater than the determined value. Particularly, the processing subsystem designates the new object to be the fallen person if the values corresponding to the determined height and the determined surface area and/or the determined volume do not change over a determined period of time. As previously noted, the determined period of time corresponds to a recovery time during which the person may get up subsequent to a fall. By way of example, the determined period of time may be about 90 seconds. The processing subsystem, however, may vary the determined period of time based on other parameters such as a location of the fall and/or the presence of another person in the field of view.

Further, at step 314, the processing subsystem generates an output through an output device coupled to the DAS and/or the processing subsystem if the height of the new object is less than the determined height and the surface area and/or the volume of the new object is greater than the determined value.

The generated output may include an audio output and/or a visual output such as flashing lights, display messages and/or an alarm through an alarm unit, an audio transmitter, a video transmitter, a display unit, or combinations thereof. Additionally, the generated output may be communicated as an alert signal through a wired and/or wireless link to appropriate personnel and/or another monitoring system to generate a warning and/or obtain assistance for the fallen person. An exemplary representation of a regenerated range image used to detect a new object disposed above the reference plane in a field of view and generate an alert upon determining a potential fall event corresponding to the new object is depicted in FIG. 5.

Figure 5:
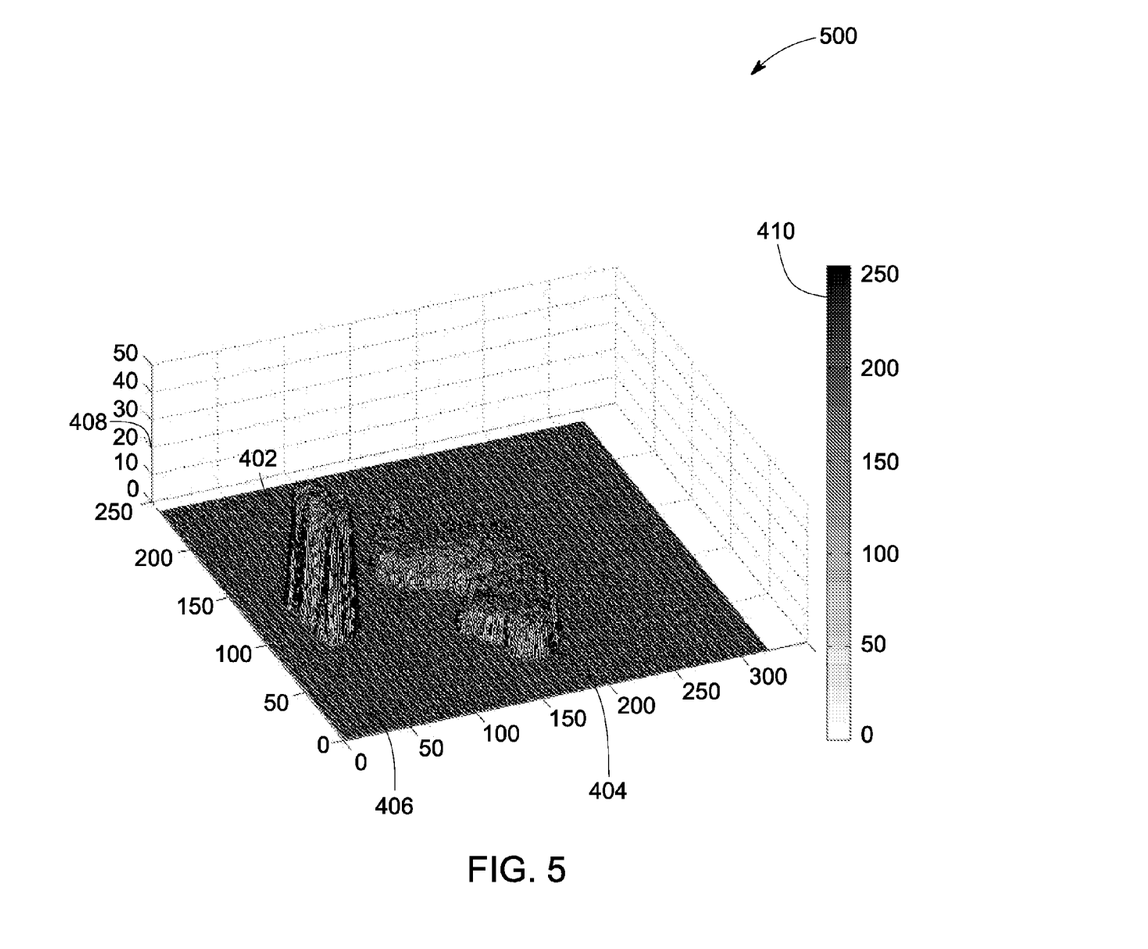
FIG. 5 is an illustration of another exemplary range image generated by an FD system, in accordance with aspects of the present technique.

FIG. 5 illustrates an exemplary representation 500 of a regenerated range image corresponding to the field of view illustrated in FIG. 4. Particularly, in FIG. 5, the elements 402 and 404 represent objects disposed above the reference plane 406. As previously noted, the element 402 corresponds to a small table. The element 404 according to the depictions of FIG. 5, however, corresponds to a person who may have experienced a fall event and is disposed above the reference plane 406 in the field of view. Moreover, the element 408 in the regenerated range image indicates the determined height. As the height of the element 404 is less than the determined height 408 and the surface area and/or the volume of the element 404 is more than the determined value, the processing subsystem determines the element 404 to be representative of a person having experienced a potential fall event. The processing subsystem, therefore, triggers an alert to an appropriate personnel or an associated health monitoring system for obtaining the required assistance for the fallen person.

The FD system and method disclosed hereinabove, thus, employs simple yet robust computations for monitoring and detecting fall events. Specifically, the system allows detection of a fall event simply by determining the height, the surface area and/or the volume of an object disposed in the field of view. The determination of the height, the surface area and/or the volume of the new object is greatly facilitated by the use of a range-imaging device as the DAS. Further, the range-imaging device generates a range image of the entire field of view simultaneously as opposed to reading one pixel or line at a time as in conventional FD applications. The use of the range-imaging device as the DAS, therefore, enables faster computations while using minimal processing. Accordingly, standard-processing devices may be used for performing computations relevant to monitoring the field of view, thereby reducing equipment cost and complexity.

Moreover, the range imaging device uses a depth map of the field of view as opposed to using an entire image to detect the fallen person used in conventional video-based monitoring applications. As previously noted, the depth map includes a plurality of range values representative of a relative distance of each object disposed in the field of view. Employing the depth map, thus, eliminates the need to store images and/or other personally identifiable information, thereby mitigating privacy concerns.

Although the exemplary embodiments of the present system disclose the use of a 3D range camera, use of any other suitable type of range imaging device, such as an active infrared and/or a time-of-flight device for detecting a fallen object is also contemplated.

While only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for detecting a fallen person, comprising:
generating an initial range image corresponding to a field of view of a data acquisition system;
identifying a reference plane disposed in the field of view of the data acquisition system;
determining one or more regions in the initial range image indicative of one or more objects disposed above the reference plane in the field of view of the data acquisition system;
regenerating a range image corresponding to the field of view of the data acquisition system after a determined time period;
comparing the regenerated range image with the initial range image to determine if the regenerated range image comprises a new object disposed above the reference plane; and
determining whether the new object disposed above the reference plane is the fallen person if a height of the new object is less than a determined height and at least one of a volume and a surface area of the new object is greater than a determined value.

2. The method of claim 1, wherein generating the range image corresponding to the field of view of the data acquisition system comprises generating a plurality of range values indicative of relative distances of one or more objects disposed in the field of view.

3. The method of claim 1, wherein identifying the reference plane disposed in the field of view comprises identifying a group of pixels oriented as a plane disposed furthest from the data acquisition system or a plane disposed at a determined distance from the data acquisition system.

4. The method of claim 1, wherein determining the one or more regions in the initial range image indicative of one or more objects disposed above the reference plane in the field of view of the data acquisition system comprises masking the one or more objects in the initial range image.

5. The method of claim 1, wherein regenerating the range image corresponding to the field of view of the data acquisition system comprises continually regenerating the range image corresponding to the field of view of the data acquisition system after the determined time period.

6. The method of claim 1, wherein comparing the regenerated range image with the initial range image further comprises determining a duration of a movement of the one or more objects, the new object, or a combination thereof, in the determined time period.

7. The method of claim 1, wherein determining whether the new object disposed above the reference plane is the fallen person comprises designating a desired height as the determined height and at least one of a desired surface area and a desired volume as the determined value.

8. The method of claim 1, further comprising generating an output upon determining that the fallen person is disposed above the reference plane for more than a determined duration of time.

9. The method of claim 8, wherein generating the output comprises generating an audio output, a visual output, an alert message, or a combination thereof.

10. A system for detecting a fallen person, comprising:
a data acquisition system that generates an initial range image corresponding to a field of view of the data acquisition system; and
a processing subsystem, communicatively coupled to the data acquisition system, wherein the processing subsystem:
identifies a reference plane disposed in the field of view of the data acquisition system;
determines one or more regions in the initial range image indicative of one or more objects disposed above the reference plane in the field of view of the data acquisition system;
regenerates a range image corresponding to the field of view of the data acquisition system after a determined time period;
compares the regenerated range image with the initial range image to determine if the regenerated range image comprises a new object disposed above the reference plane; and
determines whether the new object disposed above the reference plane is the fallen person if a height of the new object is less than a determined height and at least one of a volume and a surface area of the new object is greater than a determined value.

11. The system of claim 10, wherein the data acquisition system comprises a range imaging device that uses the time-of-flight, coded aperture, structured light, or the triangulation principle.

12. The system of claim 10, wherein the data acquisition system generates the initial range image corresponding to the field of view of the data acquisition system by generating a plurality of grey scale or color scale values indicative of a relative distance of the one or more objects disposed in the field of view.

13. The system of claim 10, wherein the processing subsystem directs the data acquisition system to continually regenerate the range image corresponding to the field of view of the data acquisition system after the determined time period.

14. The system of claim 10, wherein the processing subsystem further determines a duration of a movement of the one or more objects, the new object, or a combination thereof, in the determined time period.

15. The system of claim 14, further comprising timing circuitry communicatively coupled to the processing subsystem through a wired network, a wireless network, or a combination thereof, for determining the determined time period corresponding to the regeneration of the range image and the determined duration of movement.

16. The system of claim 10, further comprising an output unit that generates an output upon determining the fallen object is disposed on the floor for more than a determined duration of time, wherein the output unit is communicatively coupled to the processing subsystem through a wired network, a wireless network, or a combination thereof.

17. The system of claim 16, wherein the output unit comprises an alarm unit, an audio transmitter, a video transmitter, a display unit, or combinations thereof.

* * * * *